United States Patent [19]

Soyka et al.

[11] Patent Number: 5,309,787
[45] Date of Patent: May 10, 1994

[54] LOCKING PIN FOR SECURING A SHIFT LINKAGE

[75] Inventors: Wilfried Soyka; Manfred Winkler; Wolfgang Steinberger, all of Herzogenaurach, Fed. Rep. of Germany

[73] Assignee: Ina Walzlager Schaeffler KG, Fed. Rep. of Germany

[21] Appl. No.: 875,343

[22] Filed: Apr. 29, 1992

[30] Foreign Application Priority Data

Apr. 29, 1991 [DE] Fed. Rep. of Germany ... 9105258[U]

[51] Int. Cl.⁵ .................................................. G05G 5/06
[52] U.S. Cl. ...................................... 74/527; 74/475; 29/441.1; 29/441.2
[58] Field of Search .................... 74/527, 475, 528; 29/441.1, 441.2, 436, 442

[56] References Cited

U.S. PATENT DOCUMENTS

| | | | |
|---|---|---|---|
| 2,671,354 | 3/1954 | Goos | 74/527 X |
| 2,791,914 | 5/1957 | Cornelius | 74/527 OR |
| 2,872,793 | 2/1959 | Botti | 74/527 X |
| 2,901,237 | 8/1959 | Gruer | 74/527 X |
| 3,368,559 | 2/1968 | Sarnoff et al. | 74/527 X |
| 3,605,246 | 9/1971 | Regnault | 29/441.1 OR |
| 3,834,006 | 9/1974 | Greene | 29/436 OR |
| 3,928,904 | 12/1975 | Jones | 29/436 OR |
| 5,011,324 | 4/1991 | Putney | 29/441.1 X |

Primary Examiner—Leslie A. Braun
Assistant Examiner—Daniel Wittels
Attorney, Agent, or Firm—Bierman and Muserlian

[57] ABSTRACT

A locking pin, in particular for the securing of shift positions of a shift linkage in automobile transmissions, comprises a hollow cylindrical shaft portion (1) which is drawn from thin-walled sheet metal and closed at one end by a bottom (2). This bottom (2) projects radially beyond the shaft portion (1). A locking element (3) projecting out of the shaft portion (1) at the open end thereof is guided longitudinally displaceable in the shaft portion (1), retained secure against loss und pre-tensioned in the locking direction by a spring (4). To obtain a locking pin which is cost-effective in manufacturing and easily dismountable, a diameter enlargement (7) serving as a stop is provided at a pre-determined distance both from the open end of the shaft portion (1) and from the bottom (2).

4 Claims, 1 Drawing Sheet

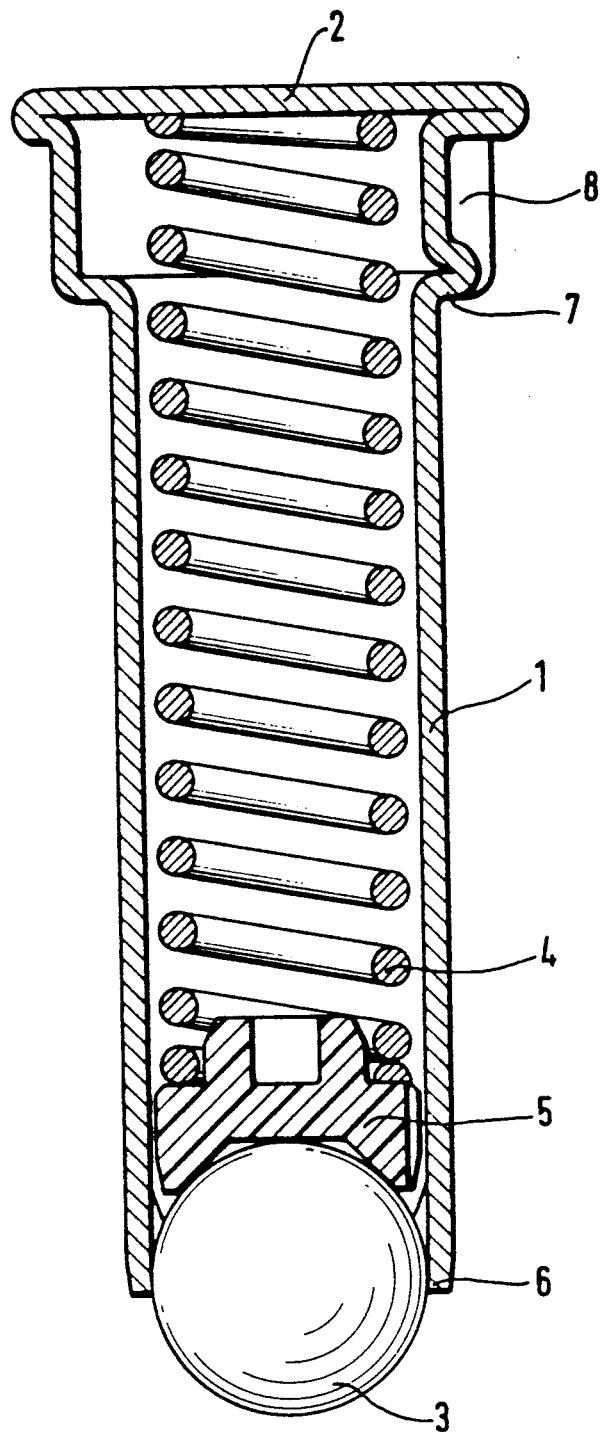

LOCKING PIN FOR SECURING A SHIFT LINKAGE

The invention concerns a locking pin according to the generic part of the main claim.

Such a locking pin, also called a ball stop, is inserted into a through-bore of the casing, for example, in an automobile transmission, the locking element engaging in corresponding recesses of the selector shaft or in locking recesses of the selector elements. The gear shifting force is determined among other things by the force of the locking element which, in its turn, depends on the pre-tension of the locking element. A simple method of adjusting this pre-tension is to press the locking pin to a certain extent into its receiving bore. The extent to which the locking pin is pressed in is determined by a stop on the locking pin, which stop abuts against the housing when the insertion depth has been reached. In former constructions, this stop was constituted by a bottom having a larger diameter than the shaft portion of the locking pin. A disadvantage of this construction, however, is that such locking pins can only be dismounted with considerable difficulty since there is no surface of application for a dismounting tool.

Other embodiments of locking pins are known, in which a locking pin of the type initially specified is inserted into a plastics body which is screwed into a threaded bore of the casing. Such a locking pin can be dismounted in a simple manner by screwing it out. The provision of an additional plastics body, however, makes the locking pin more expensive.

The object of the invention is therefore to provide a locking pin which is cost-effective in manufacturing and can still be dismounted in a simple manner.

This object is achieved by the characterizing features of the main claim. By the arrangement of a stop at a defined distance from the end of the shaft portion facing away from the bottom, on the one hand the force exerted by the locking element on the selector elements or the selector fork is reliably fixed, and on the other hand it is assured that the bottom of the shaft portion and a surface of a transmission casing are spaced sufficiently apart from each other to allow a dismounting tool to be applied.

To prevent the portion of the shaft between the stop and the bottom from being deformed during the pressing-in procedure, in an advantageous embodiment of the invention, reinforcing beads are provided in the region between the diameter enlargement constituting the stop, and the bottom.

Further, a method of manufacturing a locking pin according to the invention is proposed in claims 3 and 4. According to this method, the shaft portion, the diameter enlargement and the bottom are made as a one-piece sheet metal part in a single deep-drawing operation. At first, the shaft is crimped at its open end to form a diameter reduction whose inner diameter is smaller than one diameter of a spherical locking element. The locking element is then pressed in a single work step through the inner diameter into the interior of the shaft portion. By the pressing-in of the spherical locking element, on the one hand the inner bore is calibrated and on the other hand, by reason of the pressing-in force it can be verified if the crimped edge assures a secure retention of the locking element.

The invention is described more closely below with the help of an example of embodiment. The only figure shows a locking pin which comprises a hollow cylindrical shaft portion 1 which is drawn from thin-walled sheet metal and closed at one end by a bottom 2 having a larger diameter than the shaft portion 1. A locking element 3, here in the form of a ball, is guided longitudinally displaceable in the shaft portion 1 and is pre-tensioned in the locking direction by a spring 4 abutting against the bottom 2. Between the spring 4 and the locking element 3, a guide plate 5 is arranged by which a rotation of the ball-shaped locking element 3 is at all rendered possible. The locking element 3 is retained secure against loss by a diameter reduction 6 of the shaft portion 1 at its end facing away from the bottom 2. At a defined distance from the end of the shaft portion 1 facing away from the bottom 2, a diameter enlargement 7 serving as a stop is provided on the shaft portion 1, which diameter enlargement has a smaller diameter than the bottom 2. In the region between this diameter enlargement 7 and the bottom 2, reinforcing beads 8 are arranged to prevent deformations.

The invention is applicable also to other locking pins in which, for example, the locking element is not in the form of a ball or in which it is received in an inner guide member which can be guided for instance by means of longitudinal guides in the shaft portion.

What we claim is:

1. A pin for securing shift positions of a shift linkage in automobile transmissions comprising a hollow cylindrical shaft portion (1) made by drawing from thin-walled sheet metal and closed at one end by a bottom (2) which projects radially beyond the shaft portion (1) in which a locking element (3) projecting out of an open end thereof is mounted for longitudinal displacement while being retained secure against loss and urged by a spring (4), characterized in that the shaft portion (1) comprises a diameter enlargement (7) which serves as a stop and is disposed at a predetermined distance both from the open end of the shaft portion (1) and from the bottom (2).

2. A pin of claim 1 wherein reinforcing beads (8) extending preferably in a longitudinal direction with respect to the shaft portion (1) are disposed on the shaft portion (1) between the diameter enlargement (7) and the bottom (2).

3. A method of making a pin of claim 1, characterized in that the shaft portion (1) is made as a one-piece sheet metal part with the diameter enlargement (7) and bottom (2) in a single deep-drawing operation.

4. Method according to claim 3, characterized in that one end of the shaft portion (1) is crimped to form a diameter reduction (6) whose inner diameter is smaller than one diameter of a spherical locking element (3), and the locking element (3) is subsequently pressed through the inner diameter of the diameter reduction (6) into the interior of the shaft portion (1).

* * * * *